United States Patent
Yoo et al.

(10) Patent No.: US 12,119,516 B2
(45) Date of Patent: Oct. 15, 2024

(54) BATTERY PACK

(71) Applicant: SAMSUNG SDI CO., LTD., Yongin-si (KR)

(72) Inventors: Dae Hyung Yoo, Yongin-si (KR); Chan Woo Kang, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 15 days.

(21) Appl. No.: 17/694,938

(22) Filed: Mar. 15, 2022

(65) Prior Publication Data

US 2022/0320690 A1 Oct. 6, 2022

(30) Foreign Application Priority Data

Mar. 30, 2021 (KR) .................. 10-2021-0041312

(51) Int. Cl.
*H01M 50/528* (2021.01)
*H01M 50/105* (2021.01)
*H02J 7/00* (2006.01)

(52) U.S. Cl.
CPC ....... *H01M 50/528* (2021.01); *H01M 50/105* (2021.01); *H02J 7/0029* (2013.01)

(58) Field of Classification Search
CPC .......................... H01M 50/528; H01M 50/105
See application file for complete search history.

(56) References Cited

U.S. PATENT DOCUMENTS

| | | | |
|---|---|---|---|
| 8,722,217 B2 | 5/2014 | Lee | |
| 2011/0206976 A1 | 8/2011 | Yoo | |
| 2012/0052332 A1* | 3/2012 | Ahn | H01M 10/4207 429/7 |
| 2015/0004439 A1* | 1/2015 | Kim | H01M 50/597 429/7 |
| 2015/0056495 A1 | 2/2015 | Song | |
| 2015/0064502 A1* | 3/2015 | Hong | H01M 10/0525 429/7 |
| 2015/0162650 A1* | 6/2015 | Ahn | H01M 10/48 429/90 |
| 2015/0318534 A1* | 11/2015 | Yoo | H01M 10/052 429/211 |

FOREIGN PATENT DOCUMENTS

| | | |
|---|---|---|
| KR | 10-2006-0118961 | 11/2006 |
| KR | 10-2011-0038914 | 4/2011 |
| KR | 10-1292998 B1 | 8/2013 |
| KR | 10-2016-0049826 A | 5/2016 |
| KR | 10-1858680 B1 | 5/2018 |
| KR | 10-2018-0083124 | 7/2018 |
| KR | 10-1937171 B1 | 1/2019 |

OTHER PUBLICATIONS

Korean Office action dated Jun. 5, 2024.

* cited by examiner

*Primary Examiner* — Jane J Rhee

(74) *Attorney, Agent, or Firm* — Lee IP Law, P.C.

(57) ABSTRACT

A battery pack including a battery cell, the battery cell including a cell tab extending from a terrace part thereof; and a protection circuit module spaced apart from the battery cell and having a module tab to which the cell tab is welded, wherein the cell tab includes a bending part that is bent a predetermined number of times.

14 Claims, 3 Drawing Sheets

BATTERY PACK

CROSS-REFERENCE TO RELATED APPLICATION

This application is based on and claims priority under 35 U.S.C. § 119 to Korean Patent Application No. 10-2021-0041312, filed on Mar. 30, 2021, in the Korean Intellectual Property Office, the disclosure of which is incorporated by reference herein in its entirety.

BACKGROUND

1. Field

Embodiments relate to a battery pack.

2. Description of the Related Art

Unlike primary batteries, which are not rechargeable, secondary batteries can be charged and discharged. A low-capacity secondary battery may be used for portable small-sized electronic devices, such as a smartphone, a feature phone, a notebook computer, a digital camera, or a camcorder, and a high-capacity secondary battery may be used as a power source for motor drives, such as those in hybrid vehicles or electric vehicles, and a battery for power storage.

Such a secondary battery may include an electrode assembly including a positive electrode plate, a separator, and a negative electrode plate, and an exterior material for accommodating the electrode assembly. The exterior material may be divided into round, prismatic and pouch types according to the shape thereof. The pouch secondary battery may be easy to deform into various shapes and may include a pouch exterior material having a small weight.

The above information disclosed in this Background section is only for enhancement of understanding of the background and therefore it may contain information that does not constitute prior art.

SUMMARY

The embodiments may be realized by providing a battery pack including a battery cell, the battery cell including a terrace part and a cell tab extending from the terrace part; and a protection circuit module spaced apart from the battery cell and having a module tab to which the cell tab is welded, wherein the cell tab includes a bending part that is bent a predetermined number of times.

The cell tab may be bent two or more times.

A level of the terrace part may be higher than a level of the module tab, or the level of the terrace part may be greater than a level of the protection circuit module.

A level of the terrace part may be the same as or lower than a level of the module tab.

The bending part may include a first bending part and a second bending part, and a radius of curvature of the first bending part may be greater than a radius of curvature of the second bending part.

The second bending part may be laterally between a proximate end and a distal end of the terrace part.

The second bending part may be spaced apart from a sidewall of the battery cell such that the second bending part does not contact the sidewall of the battery cell.

The first bending part and the second bending part may be spaced apart from each other in a horizontal direction parallel to a plane of the terrace part and in a vertical direction perpendicular to the plane of the terrace part.

The battery pack may further include a sealing member at a distal end of the terrace part, wherein the second bending part is laterally between a proximate end of the terrace part and the sealing member.

The module tab may be spaced apart from the terrace part in a horizontal direction parallel to a plane of the terrace part, and a part of the protection circuit module may overlap the terrace part in a vertical direction perpendicular to the plane of the terrace part.

Parts of the module tab and the protection circuit module may be spaced apart from the terrace part in a horizontal direction parallel to a plane of the terrace part so as to not overlap the terrace part.

The protection circuit module may include a cutout part provided by cutting a portion of the protection circuit module.

The cell tab may further include a third bending part in a region adjacent to the module tab.

The battery pack may further include an insulation member between the bending part and the terrace part.

The battery pack may further include a support frame below the terrace part and the cell tab.

BRIEF DESCRIPTION OF DRAWINGS

Features will be apparent to those of skill in the art by describing in detail exemplary embodiments with reference to the attached drawings in which.

DETAILED DESCRIPTION

Figure 1:
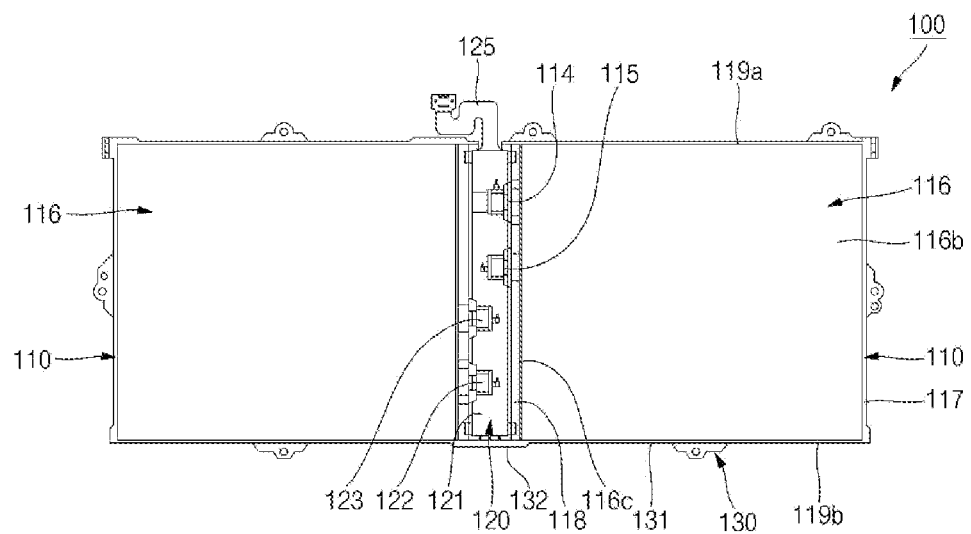
FIG. 1 is a plan view of an exemplary battery pack according to the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms, and include any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms, e.g., the terms are not intended to imply or require sequential inclusion. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

As the area and thickness of a laptop computer have decreased, the rigidity of the battery pack for supplying power to the laptop computer may also be reduced, which could cause a fragile structure in the battery pack to be broken due to an external impact (e.g., an impact generated when typing on a keyboard of a laptop computer). Cell tabs (e.g., a positive cell tab or a negative cell tab) that electrically connect the battery cell and the protection circuit module could be broken due to the impact when typing on the keyboard. The embodiments may provide a battery pack that is resistant to external impacts by bending a cell tab at least twice in a battery pack including a battery cell and a protection circuit module, on which the following description will focus.

FIG. 1 is a plan view of an exemplary battery pack 100 according to the present disclosure. In the example shown in FIG. 1, the exemplary battery pack 100 according to the present disclosure may include, e.g., a battery cell 110, a protection circuit module 120, and a protective frame 130.

The battery cell 110 may include an electrode assembly (110A of FIG. 2B or 3B), a positive electrode cell tab 114, a negative electrode cell tab 115, and a pouch 116. The positive electrode cell tab 114 may extend to the outside of the pouch 116 and may be (e.g., electrically) connected to the positive electrode plate (111 of FIG. 2B or 3B) of the electrode assembly 110A, and the negative electrode cell tab 115 may extend to the outside of the pouch 116 and may be (e.g., electrically) connected to the negative electrode plate 112 of the electrode assembly 110A. The pouch 116 may include a bottom part 116a, a top part 116b, a front part 116c, a backside part 117, a terrace part 118, and side sealing parts 119a and 119b. The positive electrode cell tab 114 and the negative electrode cell tab 115 may extend to the outside of the battery cell 110 through the terrace part 118. The pouch 116 may protect the electrode assembly 110A from external environments, and for this purpose, in addition to the side sealing parts 119a and 119b, the terrace part 118 may also be sealed.

The protection circuit module 120 may include a substrate 121, a positive electrode module tab 122 (to which the positive electrode cell tab 114 may be connected), a negative electrode module tab 123 (to which the negative electrode cell tab 115 may be connected), a charge/discharge protection device 124, and a connector 125. The protection circuit module 120 may help prevent overcharging or overdischarging of the battery cell 110. The connector 125 may be connected to an external electronic device (e.g., a laptop computer or a charger) to charge or discharge the battery cell 110.

In an implementation, battery cells 110 may be arranged or located on opposite sides of the protection circuit module 120. Accordingly, the positive electrode cell tab 114 and the negative electrode cell tab 115 drawn out through the terrace part 118 of the battery cell 110 may be in a region spaced apart from the center of the battery cell 110.

In an implementation, as shown in FIG. 1, the positive electrode cell tab 114 and the negative electrode cell tab 115 of the left battery cell 110 may be in a lower region spaced apart from the central region of the battery cell 110, and the positive electrode cell tab 114 and the negative electrode cell tab 115 of the right battery cell 110 may be in an upper region spaced apart from the central region of the battery cell 110.

The protective frame 130 may include a cell frame 131 surrounding the peripheral region of the battery cell 110, e.g., the backside part 117 and the side sealing parts 119a and 119b, and a module frame 132 surrounding the protection circuit module 120. In an implementation, a partition wall may be in a boundary region between the cell frame 131 and the module frame 132, which may be defined as a component of the cell frame 131 or a component of the module frame 132.

In an implementation, a label surrounding the outer periphery of the protective frame 130 may further be included.

Figure 2A:
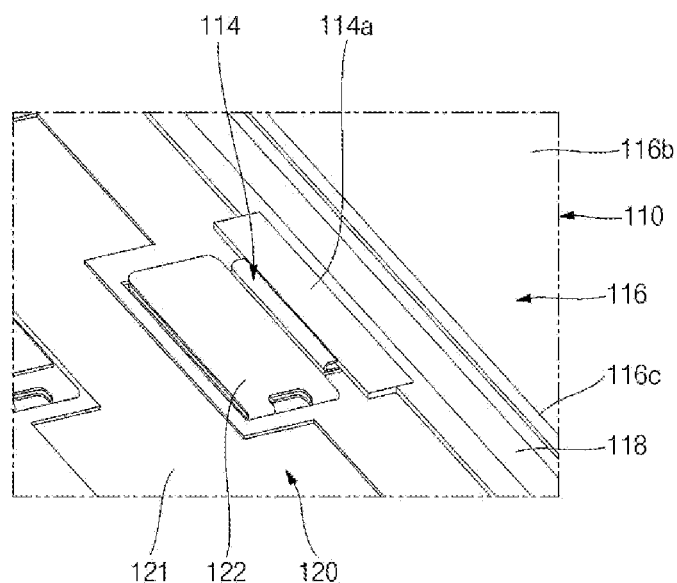
FIGS. 2A and 2B are a partially enlarged perspective view and a partially enlarged cross-sectional view of an exemplary battery pack according to the present disclosure.
Figure 2B:
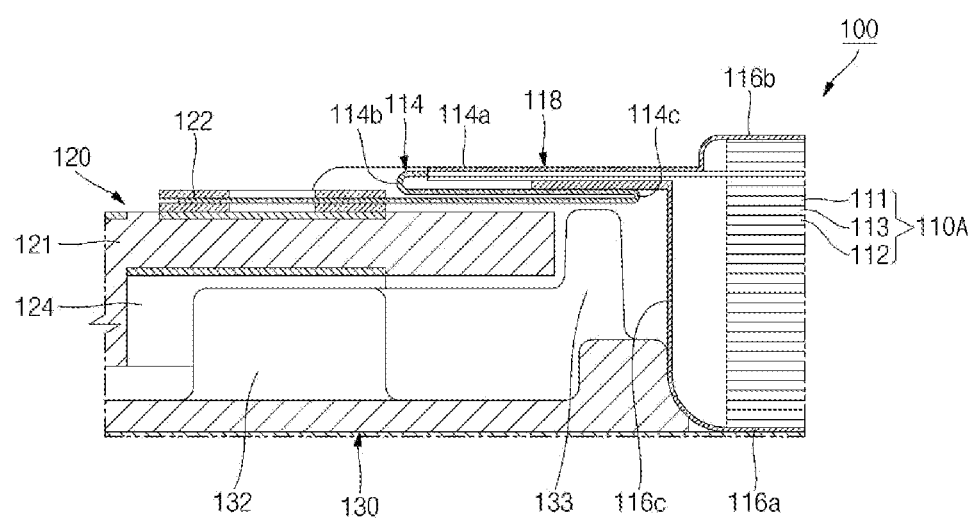

FIGS. 2A and 2B are a partially enlarged perspective view and a partially enlarged cross-sectional view of an exemplary battery pack 100 according to the present disclosure. In the example shown in FIGS. 2A and 2B, the battery pack 100 may include a battery cell 110, a protection circuit module 120, and a protective frame 130.

In an implementation, the battery cell 110 may include an electrode assembly 110A to which cell tabs 114 and 115 are connected, and the electrode assembly 110A may include a positive electrode plate 111, a negative electrode plate 112, and a separator 113 therebetween. In an implementation, the cell tabs 114 and 115 may include or be referred to as electrode tabs, lead tabs, electrode leads, tabs, or leads. In an implementation, the cell tabs 114 and 115 may include aluminum, copper, nickel, or an alloy thereof. The cell tabs 114 and 115 may electrically connect the electrode assembly 110A and the protection circuit module 120 to each other.

In an implementation, the electrode assembly 110A may be protected from the external environments by being wrapped by the pouch 116. In an implementation, a liquid electrolyte, a gel electrolyte, or a solid electrolyte may be accommodated inside the pouch 116. In an implementation, the pouch 116 may include or be referred to as a laminate exterior material in which an insulating layer is on an upper surface and a lower surface of a metal thin film, respectively. In an implementation, the pouch 116 may include a bottom part 116a under the electrode assembly 110A, a top part 116b on top of the electrode assembly 110A as an upper portion of the bottom part 116a, a front part 116c in front of the top part 116b, and a terrace part 118 extending from the front part 116c and the bottom part 116a while the positive electrode cell tab 114 and the negative electrode cell tab 115 pass therethrough. In an implementation, a plane of the terrace part 118 may be substantially parallel to a plane of the bottom part 116a or a plane of the top part 116b, and may be substantially perpendicular to a plane of the front part 116c. In an implementation, the terrace part 118 may include or be referred to as a front sealing part, a front flat part, a front projection, or a front extension.

In an implementation, the positive electrode module tab 122 (to which the positive electrode cell tab 114 may be connected) may include or be referred to as a positive electrode pad, a positive electrode welding tab, a positive electrode lead tab, a tab, or a lead. In an implementation, the positive electrode module tab 122 may be in the form of two plates spaced apart from each other, and a laser or ultrasonic wave may be provided to the positive electrode module tab 122 in a state in which the positive electrode cell tab 114 is sandwiched between the two plates to then be welded to each other. The positive electrode module tab 122 may include aluminum, copper, nickel, or an alloy thereof. In an implementation, the positive electrode module tab 122 may be in the form of one plate, and a laser or ultrasonic wave may be provided to the positive electrode cell tab 114 in a state in which the positive electrode cell tab 114 is placed on the one plate to then be welded to each other.

In an implementation, the negative electrode module tab 123 (to which the negative electrode cell tab 115 may be connected) may include or be referred to as a negative electrode pad, a negative electrode welding tab, a negative electrode lead tab, a tab, or a lead. In an implementation, the negative electrode module tab 123 may be in the form of two plates spaced apart from each other, and a laser or ultrasonic wave may be provided to the negative electrode module tab 123 in a state in which the negative electrode cell tab 115 is sandwiched between the two plates to then be welded to each other. The negative electrode module tab 123 may include aluminum, copper, nickel, or an alloy thereof. In an implementation, the negative electrode module tab 123 may be in the form of one plate, and a laser or ultrasonic wave may be provided to the negative electrode cell tab 115 in a state in which the negative electrode cell tab 115 is placed on the one plate to then be welded to each other.

The following description will be given on the basis of the positive electrode cell tab 114, and the negative electrode cell tab 115 may also include a configuration similar to that of the positive electrode cell tab 114. In the example shown in FIGS. 2A and 2B, the exemplary battery pack 100 according to the present disclosure may include a cell tab 114 having, e.g., bending parts 114b and 114c, such that the cell tab may be bent a predetermined number of times (e.g., 2 to 4 times). The bending parts may include or be referred to as bent parts, curved parts, round parts, or flexural parts.

In an implementation, the bending parts of the cell tab 114 may include a first bending part 114b and a second bending part 114c. In an implementation, the first bending part 114b may be adjacent to a distal end of the terrace part 118 (e.g., relative to the battery cell 110), and the second bending part 114c may be adjacent to a start or proximate end of the terrace part 118 (e.g., relative to the battery cell 110). In an implementation, the bending parts including, e.g., the first bending part 114b and the second bending part 114c, may be bent to form an approximately S shape. In an implementation, the proximate end of the terrace part 118 may mean a region that is relatively close or proximate to the front part 116c, and the distal end of the terrace part 118 may mean a region that is relatively far from or distal to the front part 116c.

In an implementation, the first bending part 114b may be in or at an outer region in the horizontal direction from the distal end of the terrace part 118 (e.g., outside or past the distal end of the terrace part 118), and may be spaced apart from the positive electrode module tab 122. In an implementation, the second bending part 114c may be in or at an outer region in the vertical direction from the lower portion of the terrace part 118 (e.g., may be spaced apart from the terrace part 118 in a vertical direction that is perpendicular to the plane of the terrace part 118), and may be spaced apart from the front part 116c.

In an implementation, a radius of curvature of the first bending part 114b may be greater than a radius of curvature of the second bending part 114c. In an implementation, a vertical width or height of the first bending part 114b may be greater than a vertical width or height of the second bending part 114c. In an implementation, the first bending part 114b may be bent relatively long (e.g., loosely), and the second bending part 114c may be bent relatively short (e.g., tightly).

In an implementation, the second bending part 114c may be at a position laterally between the proximate end and the distal end of the terrace part 118. In an implementation, the second bending part 114c may be spaced apart from the battery cell 110 so as not to contact the pouch 116. In an implementation, the second bending part 114c may be spaced apart from the front part 116c and the terrace part 118 of the battery cell 110, and thus may not contact either the front part 116c or the terrace part 118. In an implementation, the first bending part 114b and the second bending part 114c may be spaced apart from each other in the horizontal direction (e.g., a direction parallel to a plane of the terrace part 118) and in the vertical direction.

In an implementation, the battery cell 110 may further include a sealing member 114a at the distal end of the terrace part 118, and the cell tab 114 may extend through the sealing member 114a. In an implementation, a part of the sealing member 114a may be inside the terrace part 118, and a remaining part of the sealing member 114a may be outside the terrace part 118. In an implementation, the second bending part 114c may be between the proximate end of the terrace part 118 and a distal end of the sealing member 114a. Here, the distal end of the sealing member 114a may mean a region of the sealing member 114a that is farthest from the terrace part 118. In an implementation, the sealing member 114a may include or be referred to as a sealing tape, a sealing film, or a sealing adhesive.

In an implementation, a height (e.g., level or distance from the protective frame 130 in the vertical direction) of the terrace part 118 may be higher than a height (e.g., level) of the module tab 122 or the protection circuit module 120. In an implementation, the module tab 122 may be spaced apart from the terrace part 118 in the horizontal direction, and a part of the protection circuit module 120 may overlap the terrace part 118 in the vertical direction. In an implementation, the bending parts, e.g., the first bending part 114b and the second bending part 114c, may be between the terrace part 118 and the protection circuit module 120. In an implementation, the first bending part 114*b* and the second bending part 114*c* may be spaced apart from each other without contacting the terrace part 118 and without contacting the protection circuit module 120.

In an implementation, the protective frame 130 may further include a support frame 133 under the terrace part 118 and the cell tab 114. The support frame 133 may support the protection circuit module 120 and at the same time may support the terrace part 118 and the cell tab 114. In an implementation, the support frame 133 may be spaced apart from the terrace part 118 and the cell tab 114, e.g., without a direct contact. In an implementation, the support frame 133 may support (e.g., contact) the terrace part 118 and the cell tab 114 from the bottom only in the event of an external impact. In an implementation, the support frame 133 may isolate the cell frame 131 and the module frame 132 from each other, and thus, if an electrolyte were to leak from the battery cell 110, the leaked electrolyte may not be transferred to the protection circuit module 120.

Figure 3A:
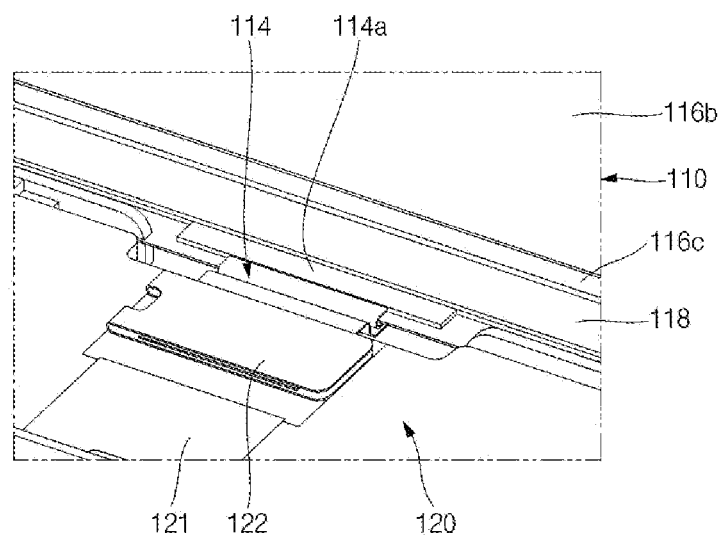
FIGS. 3A and 3B are a partially enlarged perspective view and a partially enlarged cross-sectional view of an exemplary battery pack according to the present disclosure.
Figure 3B:
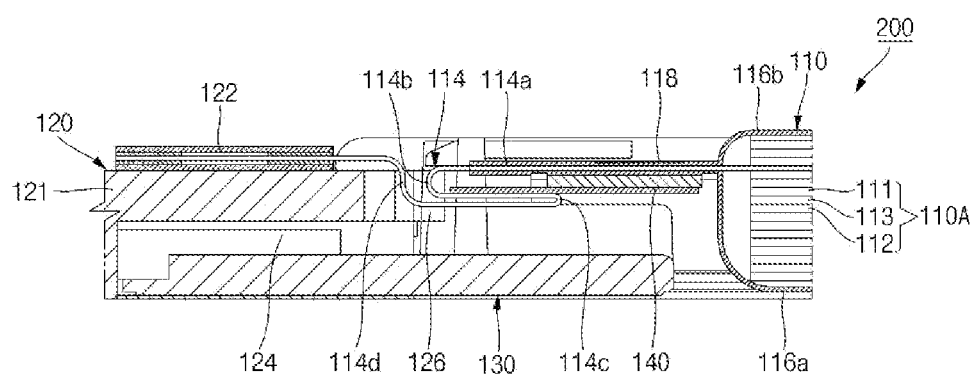

FIGS. 3A and 3B are a partially enlarged perspective view and a partially enlarged cross-sectional view of an exemplary battery pack 200 according to the present disclosure. In the example shown in FIGS. 3A and 3B, the exemplary battery pack 200 according to the present disclosure may be substantially similar to the battery pack 100 shown in FIGS. 2A and 2B, except that a cutout part 126 may be in a protection circuit module 120, and a height (e.g., level) of the protection circuit module 120 may be substantially similar to a height (e.g., level) of a terrace part 118.

In an implementation, the level (e.g., distance from the protective frame 130 in the vertical direction) of the terrace part 118 may be the same as or lower than the level of the module tab 122. In an implementation, the module tab 122 and a part of the protection circuit module 120 may be spaced apart from the terrace part 118 in the horizontal direction, and may not overlap the terrace part 118. In an implementation, a part of the protection circuit module 120 may include a cutout part 126 provided by being cut from the protection circuit module 120. In an implementation, the cell tab 114 may further include a third bending part 114*d* in a region adjacent to the module tab 122. In an implementation, the third bending part 114*d* may be bent in or to form an approximately S shape. With this configuration, the battery pack 200 may accommodate a thinner battery cell 110.

In an implementation, the battery pack 200 may further include an insulating member 140 between the bending parts 114*b* and 114*c* of the cell tab 114 and the terrace part 118. With this configuration, frequent contacts between the second bending part 114*c* and the terrace part 118 may be prevented.

One or more embodiments may provide a battery pack capable of preventing a breakage of a cell tab even when an external impact is applied thereto.

As described above, the embodiments may provide a battery pack in which the cell tab may not be broken even when an external impact is applied thereto. In some examples, by bending the cell tab at least twice and making the cell tab relatively long, the embodiments may provide a battery pack capable of preventing the cell tab from breaking by absorbing the impact while freely moving the elongated cell tab when the external impact is applied thereto.

In the battery pack according to the embodiments, the bending part that is bent a number of times or at least two times may move loosely in the event of an external impact absorbing and alleviating the impact, thereby preventing the cell tab from breaking.

The battery pack according to the embodiments may accommodate a relatively thick battery cell.

The battery pack according to the embodiments may accommodate a relatively thin battery cell.

In the battery pack according to the embodiments, a radius of curvature of the first bending part is larger than a radius of curvature of the second bending part, thereby sufficiently securing a vertical distance between the terrace part and the cell tab and appropriately securing a vertical distance between the protection circuit module and the cell tab.

In the battery pack according to the embodiments, the length of the cell tabs overlapping in the vertical direction may be sufficiently secured, and thus the cell tabs may sufficiently move in the event of an external impact.

In the battery pack according to the embodiments, the second bending part may not directly contact the battery cell (i.e., the front part), and the surface of the pouch may not be damaged when an external impact is applied thereto.

In the battery pack according to the embodiments, the first and second bending parts may be in the form of a spring, and the external impact may be absorbed and mitigated.

In the battery pack according to the embodiments, the sealing member having higher ductility than the terrace part may surround the cell tab, and the second bending part may be located below the terrace part, thereby further mitigating the external impact.

The battery pack according to the embodiments may provide a relatively compact battery pack.

The battery pack according to the embodiments may further mitigate an external impact with the third bending part.

The battery pack according to the embodiments may help prevent damage to the cell tab or the terrace part by minimizing contacts between the cell tab and the terrace part.

In the battery pack according to the embodiments, the support frame may stably support the terrace part and the lower region of the cell tab in the event of an external impact, thereby preventing damage to the cell tab and the terrace part. In addition, when electrolyte leaks from the battery cell, the leaked electrolyte may not flow to the protection circuit module due to the support frame.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
 a battery cell, the battery cell including a terrace part and a cell tab extending from the terrace part; and
 a protection circuit module spaced apart from the battery cell and having a module tab to which the cell tab is welded,
 wherein:
 the cell tab includes a bending part that is bent a predetermined number of times to form an approximately S-shape, the module tab is spaced apart from the terrace part in a horizontal direction parallel to a plane of the terrace part and does not overlap any portion of the terrace part, the bending part includes a first bending part and a second bending part, and the second bending part is horizontally between a proximate end and a distal end of the terrace part.

2. The battery pack as claimed in claim 1, wherein the cell tab is bent two or more times.

3. The battery pack as claimed in claim 1, wherein:

a level of the terrace part is higher than a level of the module tab, or the level of the terrace part is greater than a level of the protection circuit module.

4. The battery pack as claimed in claim 1, wherein a level of the terrace part is the same as or lower than a level of the module tab.

5. The battery pack as claimed in claim 1, wherein a radius of curvature of the first bending part is greater than a radius of curvature of the second bending part.

6. The battery pack as claimed in claim 5, wherein the second bending part is spaced apart from a sidewall of the battery cell such that the second bending part does not contact the sidewall of the battery cell.

7. The battery pack as claimed in claim 5, wherein the first bending part and the second bending part are spaced apart from each other in the horizontal direction parallel to the plane of the terrace part and in a vertical direction perpendicular to the plane of the terrace part.

8. The battery pack as claimed in claim 5, further comprising a sealing member at the distal end of the terrace part, wherein the second bending part is laterally between the proximate end of the terrace part and the sealing member.

9. The battery pack as claimed in claim 1, wherein a part of the protection circuit module overlaps the terrace part in a vertical direction perpendicular to the plane of the terrace part.

10. The battery pack as claimed in claim 1, wherein part of the protection circuit module is spaced apart from the terrace part in the horizontal direction parallel to the plane of the terrace part so as to not overlap the terrace part.

11. The battery pack as claimed in claim 10, wherein the protection circuit module includes a cutout part provided by cutting a portion of the protection circuit module.

12. The battery pack as claimed in claim 1, wherein the cell tab further includes a third bending part in a region adjacent to the module tab.

13. The battery pack as claimed in claim 1, further comprising an insulation member between the bending part and the terrace part.

14. The battery pack as claimed in claim 10, further comprising a support frame below the terrace part and the cell tab.

\* \* \* \* \*